United States Patent
Tsuji et al.

(10) Patent No.: US 6,826,392 B2
(45) Date of Patent: Nov. 30, 2004

(54) MULTIPATH NOISE REDUCTION METHOD, MULTIPATH NOISE REDUCER, AND FM RECEIVER

(75) Inventors: Masayuki Tsuji, Tokyo (JP); Masahiro Tsujishita, Tokyo (JP); Kenichi Taura, Tokyo (JP); Masayuki Ishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 356 days.

(21) Appl. No.: 10/095,060

(22) Filed: Mar. 12, 2002

(65) Prior Publication Data

US 2003/0022650 A1 Jan. 30, 2003

(30) Foreign Application Priority Data

Jul. 26, 2001 (JP) ........................................ 2001-225780

(51) Int. Cl.[7] .............................. H04B 1/10; H04B 1/16
(52) U.S. Cl. ....................... 455/296; 455/65; 455/297; 455/305; 455/308; 455/309; 375/346
(58) Field of Search ................................ 455/296, 297, 455/65, 67.11, 63.1, 226.1, 305, 306, 307, 308, 309, 312, 501; 375/346, 254, 278, 284, 317; 348/607, 622, 683

(56) References Cited

U.S. PATENT DOCUMENTS

| 4,860,104 | A | * | 8/1989 | Katsuyama | ................ 348/620 |
|---|---|---|---|---|---|
| 5,105,274 | A | * | 4/1992 | Sakamoto | ................ 348/627 |
| 5,410,751 | A | | 4/1995 | Yokoyama | ................ 405/212 |
| 5,699,386 | A | * | 12/1997 | Measor et al. | ............. 375/350 |
| 6,173,166 | B1 | * | 1/2001 | Whitecar | ................ 455/296 |
| 6,385,261 | B1 | * | 5/2002 | Tsuji et al. | ............... 375/346 |
| 6,665,526 | B2 | * | 12/2003 | Tsuji et al. | ............... 455/296 |

FOREIGN PATENT DOCUMENTS

EP          1071220 A2    1/2001    ............ H04B/1/16

* cited by examiner

Primary Examiner—Duc M. Nguyen
(74) Attorney, Agent, or Firm—Birch, Stewart, Kolasch & Birch, LLP

(57) ABSTRACT

A multipath noise reducer extracts a high-frequency signal from a demodulated signal obtained from a frequency-modulated signal, and generates a noise reduction coefficient from the extracted high-frequency signal. The demodulated signal is also separated into high-frequency and low-frequency components, the high-frequency component is multiplied by the noise reduction coefficient, and the resulting product is added to the low-frequency component. An output signal is thereby obtained in which the spike noise that characterizes multipath reception of a frequency-modulated signal is reduced with relatively little distortion of other parts of the signal, including the parts between noise spikes. The distortion can be further reduced by replacing the demodulated signal with an interpolated signal during noise spikes before the low-frequency component is separated.

19 Claims, 19 Drawing Sheets

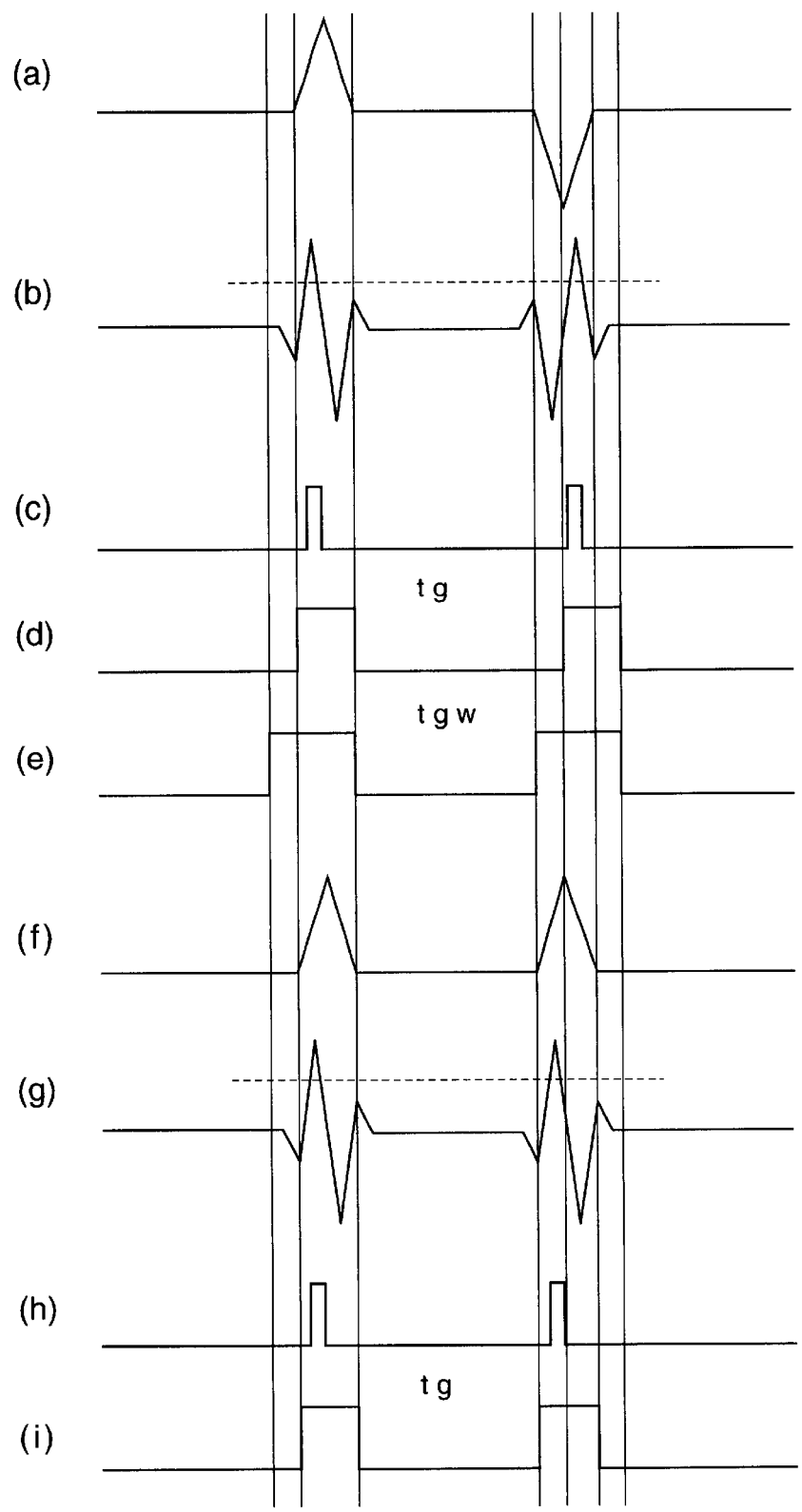

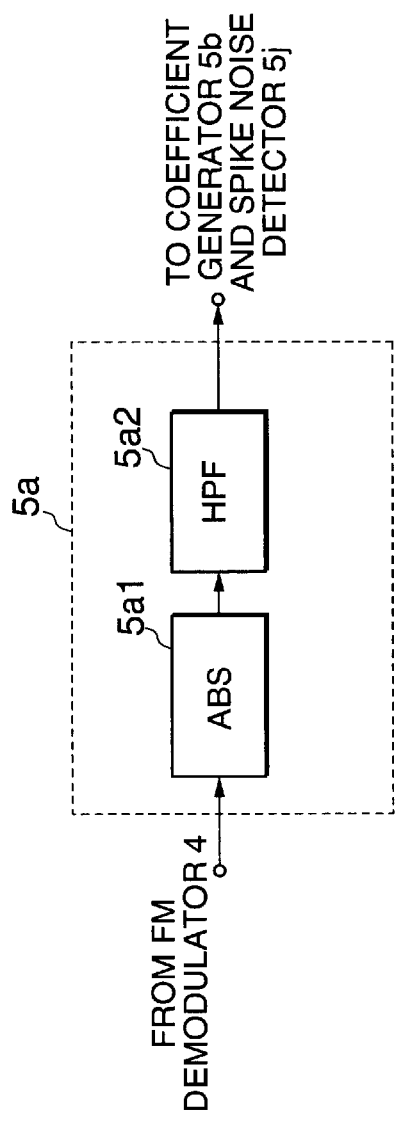
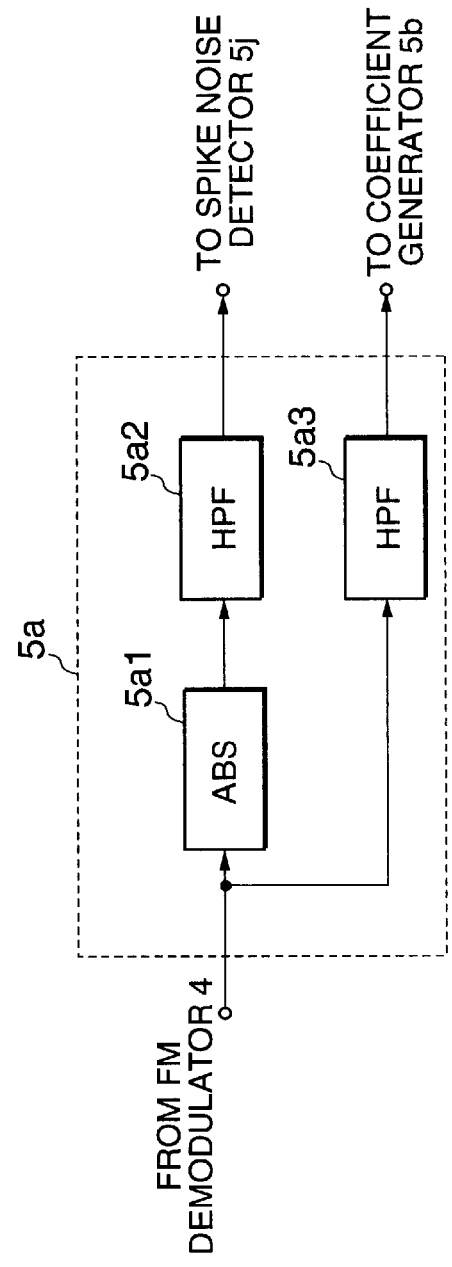

MULTIPATH NOISE REDUCTION METHOD, MULTIPATH NOISE REDUCER, AND FM RECEIVER

BACKGROUND OF THE INVENTION

1. Field of the Invention

This invention relates to a method and apparatus for reducing multipath noise in an audio signal transmitted by frequency modulation of a carrier wave (an FM audio signal), and to an FM receiver including a multipath noise reducer.

2. Description of the Related Art

Radio receivers must contend with various types of electromagnetic noise. Radio broadcast receivers mounted in automobiles, for example, pick up ignition noise and mirror noise, which are impulsive in character and are generally referred to as impulse noise. Such car radios also experience episodes of multipath noise due to reflection of radio waves from hills, high buildings, and other passing objects. Multipath noise occurs because the car radio antenna receives both a line-of-sight signal, coming directly from the transmitting antenna, and reflected signals, reflected from the passing objects. The reflected signals tend to be out of phase with the line-of-sight signal, causing the line-of-sight signal to be partly attenuated by the reflected signals, so that the received signal level is reduced. The resulting deterioration in quality of the audio output from a car radio is a familiar experience to automobile riders.

Various methods of reducing noise are known. In an FM stereo car radio, one method is to detect the strength of the electric field received at the antenna, and take noise countermeasures when the field is weak. For example, it is possible to reduce the degree of stereo separation, or to switch completely from stereo to monaural operation, a countermeasure referred to below as stereo separation control. It is also possible to attenuate or "cut" high-frequency components in the demodulated signal, a countermeasure referred to below as high-cut control. Both of these countermeasures improve the signal-to-noise (S/N) ratio during intervals when the electric field received at the antenna is weak.

To reduce impulse noise, car radios may also include an impulse noise reducer that detects the onset of impulse noise and generates a gate signal having a predetermined length sufficient to cover the expected duration of the impulse noise, which is typically less than a millisecond. When the gate signal is active, the signal output by the car radio is held constant, effectively suppressing the noise. The gate pulse used in this type of impulse noise reducer, however, is too short to mask multipath noise, which usually lasts considerably longer than a millisecond.

Japanese Unexamined Patent Application Publication No. H2-283129 discloses a noise reducer having an additional multipath noise detector and generating longer gate pulses to cover multipath noise intervals, but these long gate pulse noticeably distort the audio output signal. Further details will be given in the detailed description of the invention.

SUMMARY OF THE INVENTION

An object of the present invention is to reduce multipath noise present in a demodulated signal obtained from a frequency-modulated signal without causing unnecessary distortion of the demodulated signal.

A more specific object of the invention is to reduce multipath spike noise in the demodulated signal without distorting the intervals between noise spikes.

In the invented method of reducing multipath noise, a high-frequency signal is extracted from the demodulated signal, and a noise reduction coefficient is generated from the extracted high-frequency signal. The demodulated signal is also separated into a high-frequency component and a low-frequency component, and the high-frequency component is multiplied by the noise reduction coefficient. The resulting product signal is added to the low-frequency component to obtain an output signal in which multipath noise is reduced.

In this way, the noise reduction coefficient is able to attenuate noise spikes without unnecessary attenuation of other parts of the demodulated signal.

The process of generating the noise reduction coefficient from the extracted high-frequency signal may include smoothing the extracted high-frequency signal, rectifying the extracted high-frequency signal by taking its absolute value, limiting the rectified high-frequency signal to a predetermined upper limit value, and offsetting parts of the rectified high-frequency signal that are less than a predetermined offset value by raising them to the offset value. All of these measures tend to reduce distortion of the output signal.

Further reduction of distortion can be obtained by comparing the extracted high-frequency signal with a threshold, thereby detecting noise spikes, replacing the demodulated signal with an interpolated signal during the noise spikes noise, and separating the low-frequency component from the resulting modified demodulated signal. The noise spikes are preferably detected from a rectified version of the extracted high-frequency signal, so that the noise spikes can be located accurately.

The invention also provides a multipath noise reducer that operates according to the method described above, and an FM radio receiver incorporating the invented multipath noise reducer.

BRIEF DESCRIPTION OF THE DRAWINGS

In the attached drawings:

FIG. 12 is a waveform diagram illustrating the operation of the high-frequency signal extractor and spike noise detector in FIG. 11;

FIG. 13 is a block diagram showing an example of the internal structure of the high-frequency signal extractor in FIG. 11;

FIG. 14 is a block diagram showing an example of the internal structure of the high-frequency signal extractor in FIG. 11;

DETAILED DESCRIPTION OF THE INVENTION

Figure 1:
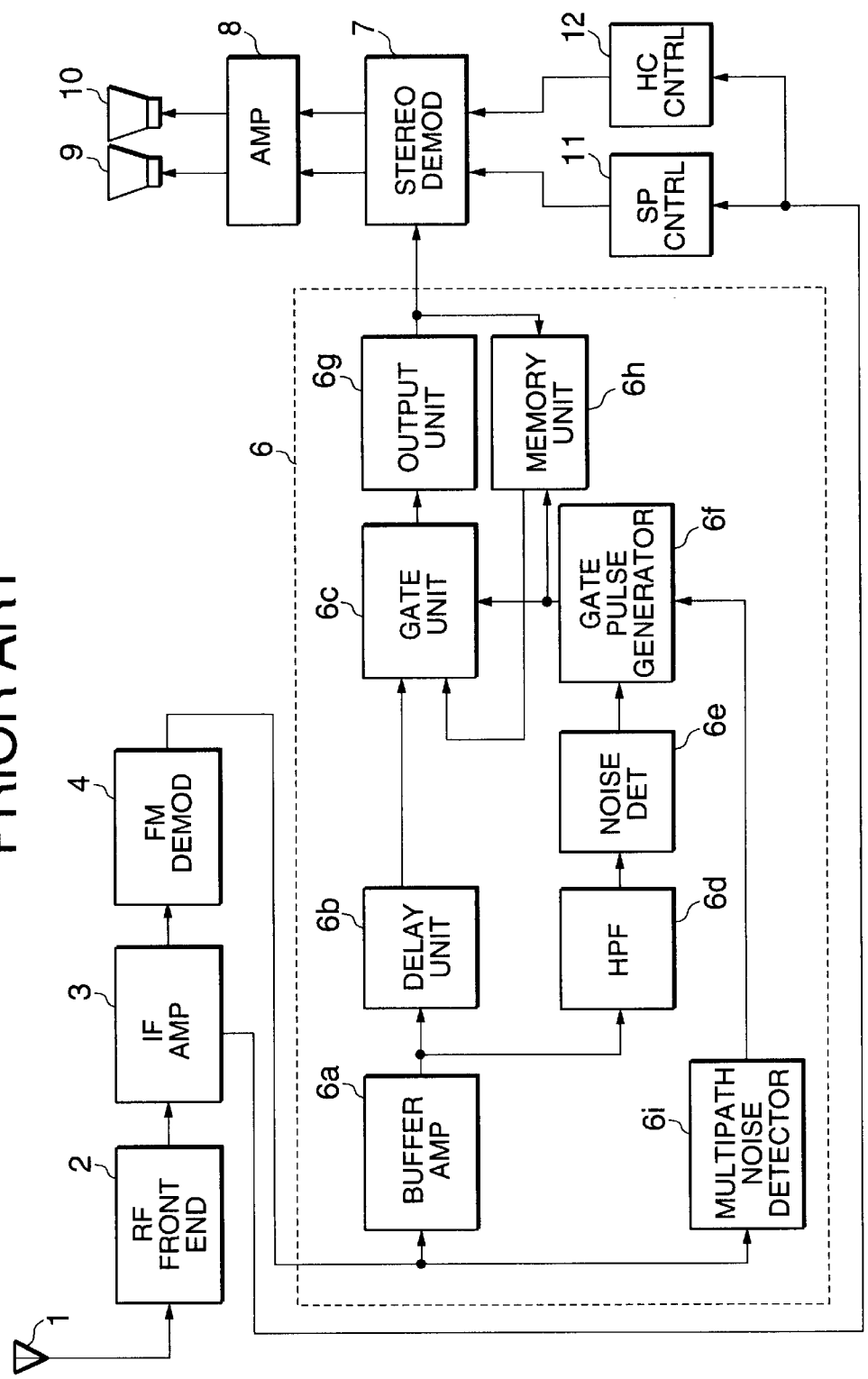
FIG. 1 is a block diagram of a conventional FM stereo radio receiver.

Embodiments of the invention will be described with reference to the attached drawings, following a description of a conventional FM stereo radio receiver having the conventional noise reducer disclosed in Japanese Unexamined Patent Application Publication No. H2-283129. Like elements in different drawings will be indicated by like reference characters.

Referring to FIG. 1, the conventional FM stereo radio receiver comprises an antenna 1, a radio-frequency (RF) signal-processing circuit or 'front end' 2, an intermediate-frequency amplifier (IF AMP) 3, an FM demodulator (DEMOD) 4, a noise reducer 6, a stereo demodulator 7, a low-frequency amplifier (AMP) 8, a pair of loudspeakers 9, 10, a stereo separation controller (SP CNTRL) 11, and a high-cut controller (HC CNTRL) 12.

The RF front end 2 amplifies the radio-frequency signal received from the antenna 1 and down-converts the amplified RF signal to the intermediate frequency. The IF amplifier 3 amplifies the resulting IF signal, and outputs both the amplified IF signal and a signal-meter signal or S-meter signal. The S-meter signal indicates the field strength of the signal as received at the antenna. The FM demodulator 4 demodulates the amplified IF signal to generate an FM composite signal. The noise reducer 6 reduces impulse noise in the FM composite signal. The stereo demodulator 7 separates the FM composite signal into a left-channel signal and a right-channel signal. The low-frequency amplifier 8 amplifies these two signals for output to the loudspeakers 9, 10. The stereo separation controller 11 performs stereo separation control on the basis of the S-meter signal. The high-cut controller 12 performs high-cut control, also on the basis of the S-meter signal.

The noise reducer 6 comprises a buffer amplifier 6a, a delay unit 6b, a gate unit 6c, a high-pass filter (HPF) 6d that extracts high-frequency impulse noise from the output of the FM demodulator 4, a noise detector (DET) 6e, a gate pulse generator 6f that generates a gate pulse when noise is detected, an output unit 6g, a memory unit 6h that stores the immediately preceding output signal, and a multipath noise detector 6i. When no noise is detected, the gate unit 6c remains closed, and the FM composite signal output from the FM demodulator 4 propagates through the buffer amplifier 6a, delay unit 6b, gate unit 6c, and output unit 6g to the stereo demodulator 7 and memory unit 6h.

When the noise detector 6e detects noise in the FM composite signal, the gate pulse generator 6f generates a gate pulse of a predetermined width such as, for example, five hundred microseconds (500 µs, the approximate width of an ignition noise impulse). This gate pulse causes the gate unit 6c to block the output signal from the delay unit 6b and instead output the signal stored in the memory unit 6h just before noise was detected, so that the noise does not reach the stereo demodulator 7.

Figure 2:
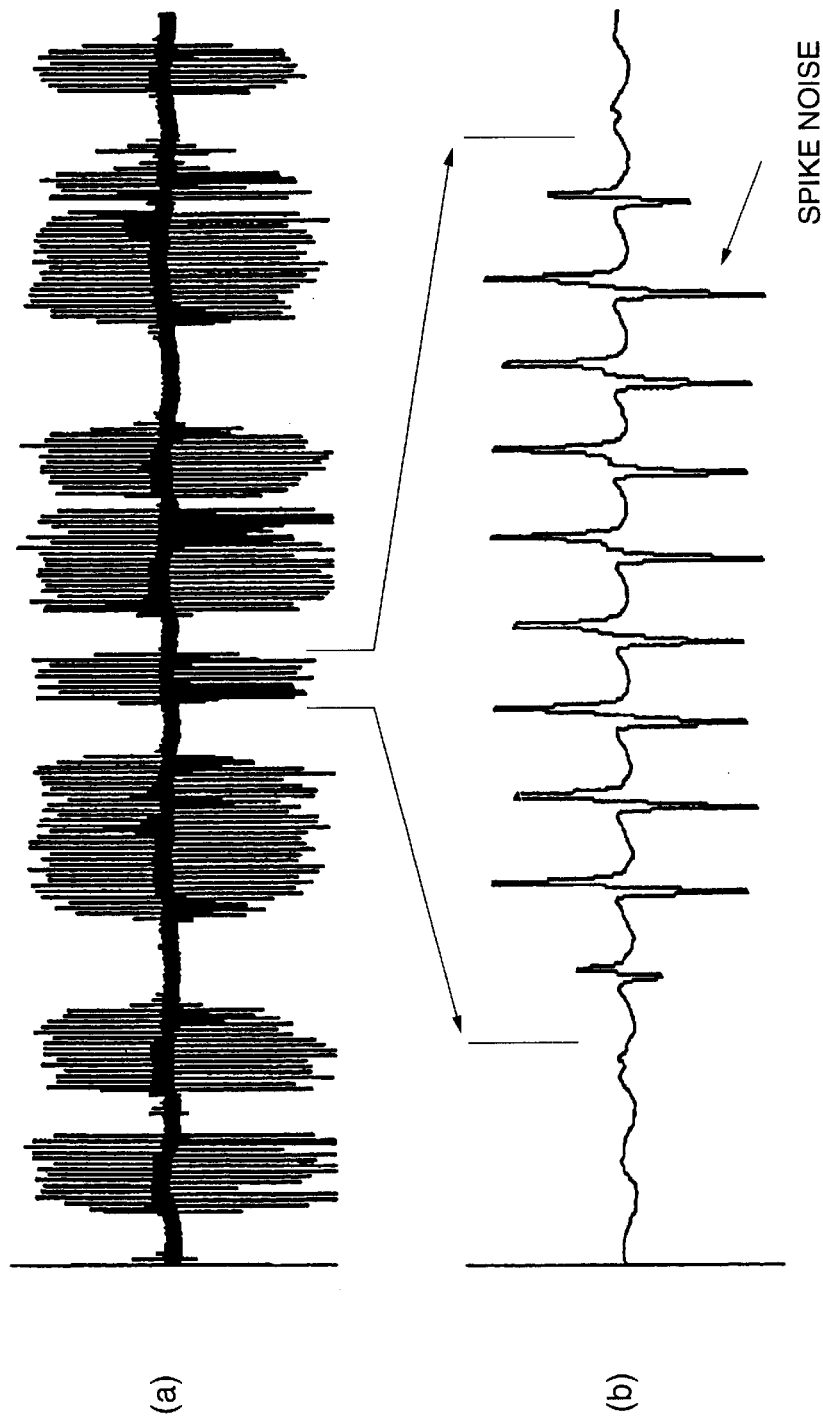
FIG. 2 illustrates a typical multipath noise waveform.

The multipath noise detector 6i detects multipath noise by detecting the associated harmonic distortion of the nineteen-kilohertz (19-kHz) pilot signal. The first waveform (a) in FIG. 2 shows a typical episode of multipath noise in an FM composite signal. The multipath noise detector 6i detects the envelope of this waveform. The second waveform (b) shows an enlargement of one multipath noise interval. Multipath noise comprises a series of spikes (spike noise), occurring at the frequency of the FM composite subcarrier, which is 38 kHz, twice the pilot signal frequency. The individual noise spikes have widths of approximately five microseconds (5 µs). For simplicity, the enlarged interval is shown as including only ten such spikes, but there may be many more; the typical duration of a multipath noise interval is from several milliseconds to several tens of milliseconds.

Upon detecting such a multipath noise interval, the multipath noise detector 6i causes the gate pulse generator 6f to generate a gate pulse of corresponding length. The gate unit 6c continues to output the signal stored in the memory unit 6h for the duration of the multipath noise interval. A resulting problem is that, although the multipath noise is eliminated, the audio output signal becomes increasingly distorted. In extreme cases, the audio output signal may even disappear.

Figure 3:
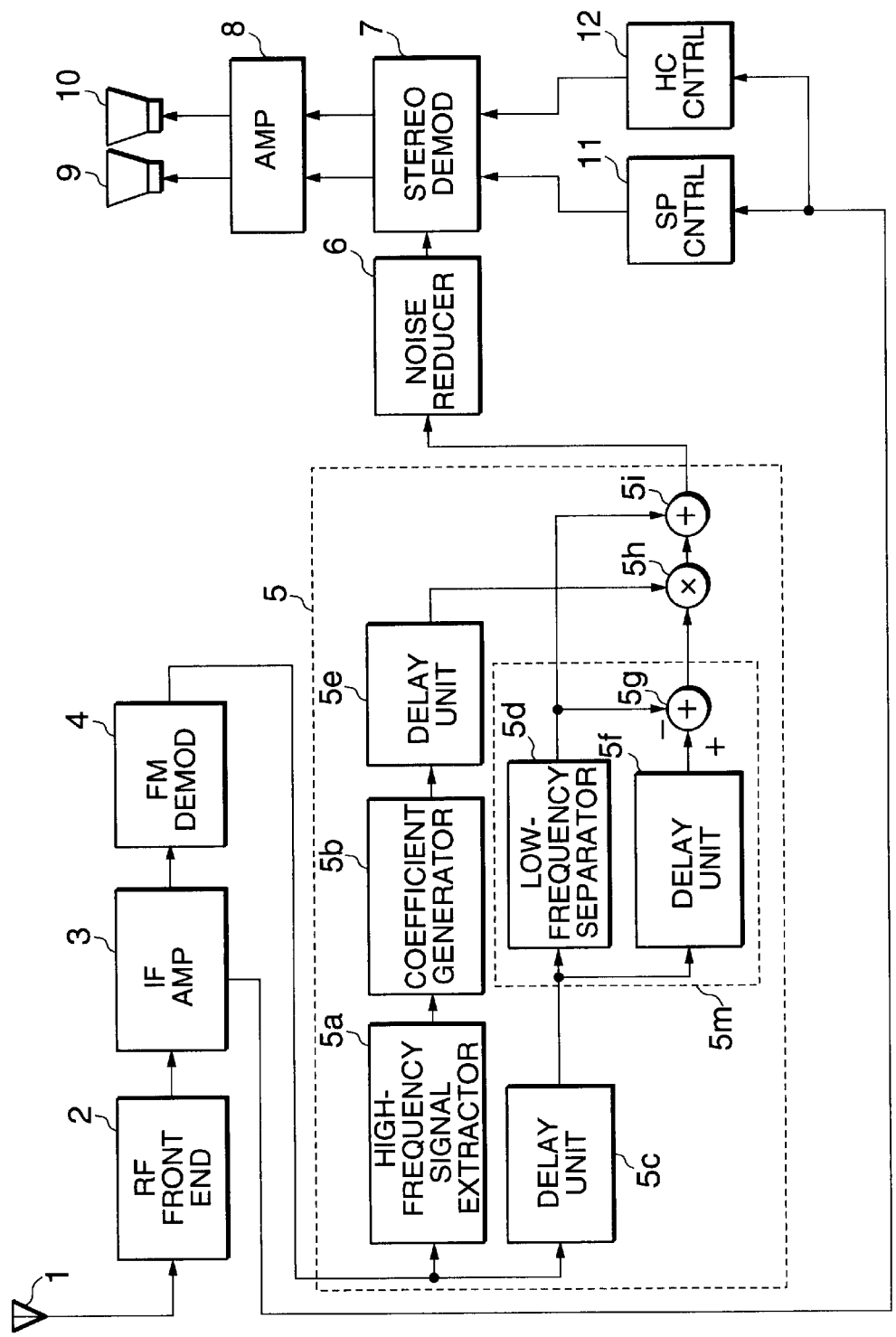
FIG. 3 is a block diagram of an FM stereo radio receiver illustrating a first embodiment of the invention.

As a first embodiment of the invention, FIG. 3 shows an FM stereo radio receiver comprising an antenna 1, an RF front end 2, an IF amplifier 3, an FM demodulator 4, a multipath noise reducer 5, a noise reducer 6, a stereo demodulator 7, a low-frequency amplifier 8, a pair of loudspeakers 9, 10, a stereo separation controller 11, and a high-cut controller 12. The multipath noise reducer 5 comprises a high-frequency signal extractor 5a, a coefficient generator 5b, a delay unit 5c, a low-frequency separator 5d, two more delay units 5e, 5f, a subtractor 5g (shown as an adder with positive and negative inputs), a multiplier 5h, and an adder 5i. The low-frequency separator 5d, delay unit 5f, and subtractor 5g constitute a signal component separator 5m. The elements external to the multipath noise reducer 5 are similar to the corresponding elements of the conventional FM receiver shown in FIG. 1, except that the noise reducer 6 has no multipath noise detector and basically reduces only impulse noise.

In the following description it will be implicitly assumed that the multipath noise reducer 5 is a digital circuit. The associated analog-to-digital and digital-to-analog conversion may be carried out in, for example, the FM demodulator 4 and stereo demodulator 7.

The overall operation of the first embodiment will now be described.

An FM broadcast signal is received by the antenna 1 and processed by the RF front end 2, IF amplifier 3, and FM demodulator 4 as described above. The FM composite signal output by the FM demodulator 4 will be referred to below simply as a demodulated signal. The demodulated signal passes through the multipath noise reducer 5, which reduces multipath noise, then through the noise reducer 6, which reduces impulse noise. After these two types of noise reduction, the demodulated signal is supplied to the stereo demodulator 7. The stereo demodulator 7, low-frequency amplifier 8, stereo separation controller 11, and high-cut controller 12 operate as in the conventional FM radio receiver. The amplified left-channel and right-channel audio signals are reproduced through the loudspeakers 9, 10.

Next, the operation of the multipath noise reducer 5 will be described in more detail with reference to the waveforms in FIGS. 2 and 4.

Multipath noise usually takes the form of a burst of spike noise, as shown in FIG. 2, the individual spikes occurring at the subcarrier frequency rate. The first waveform (a) in FIG. 4 shows a brief multipath noise interval in the demodulated signal output from the FM demodulator 4, including five such spikes. In the multipath noise reducer 5, this demodulated signal is processed as shown by waveforms (b) to (h). For simplicity, the associated processing delays are ignored in FIG. 4, so that the waveforms are aligned as indicated by the vertical dotted lines.

The high-frequency signal extractor 5a comprises, for example, a high-pass filter with a cut-off frequency set high enough to detect the individual noise spikes that constitute multipath noise. The second waveform (b) in FIG. 4 shows an example of the output of the high-frequency signal extractor; the extracted high-frequency signal includes both spike noise and other high-frequency components.

From the output of the high-frequency signal extractor 5a, the coefficient generator 5b generates a coefficient that varies between values of zero and one so as to selectively attenuate the spike noise. This coefficient, referred to below as a noise reduction coefficient, has a waveform like the fourth waveform (d) shown in FIG. 4. The noise reduction coefficient is output through delay unit 5e to the multiplier 5h.

Figure 4:
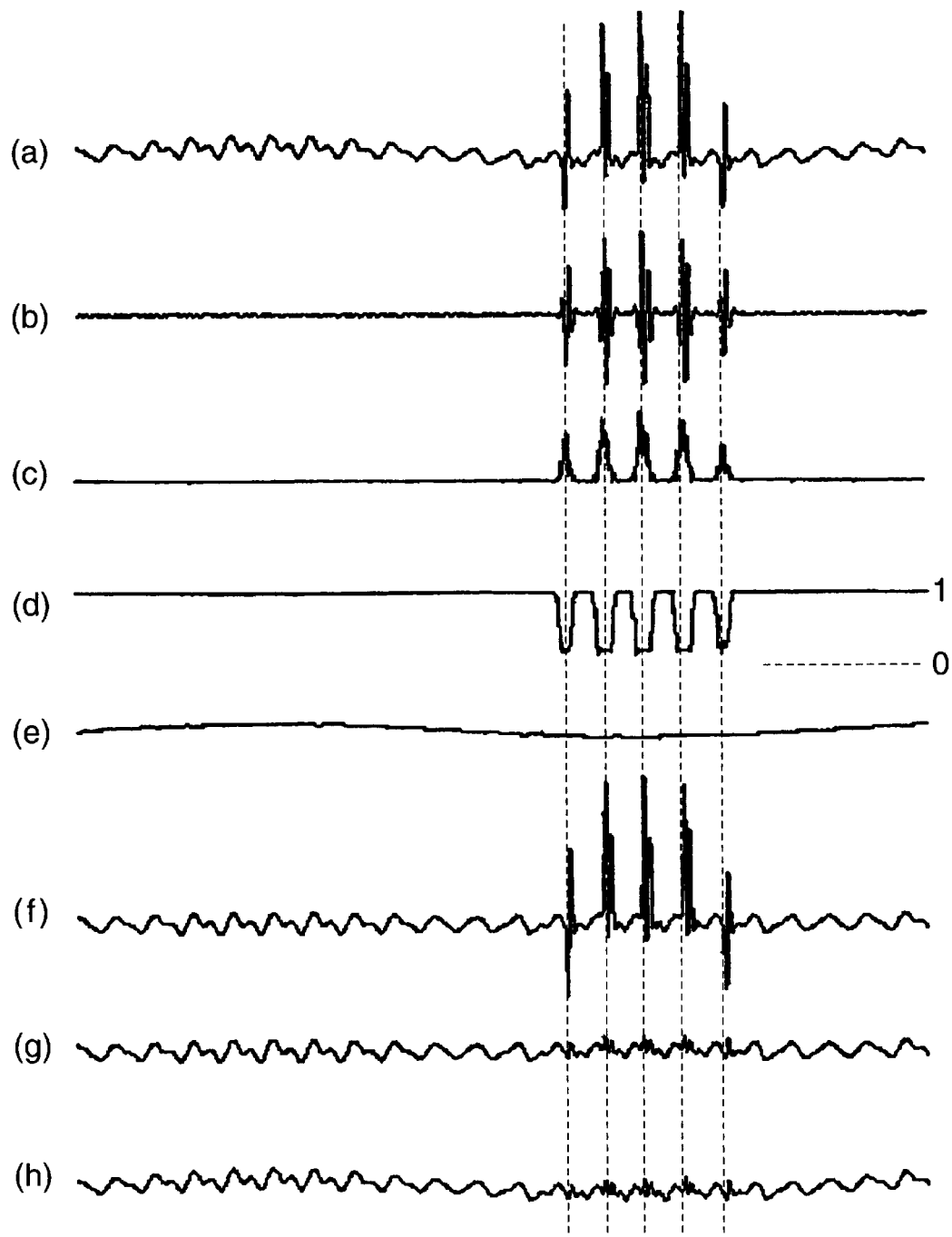
FIG. 4 is a waveform diagram illustrating the operation of the multipath noise reducer in FIG. 3.
Figure 5:
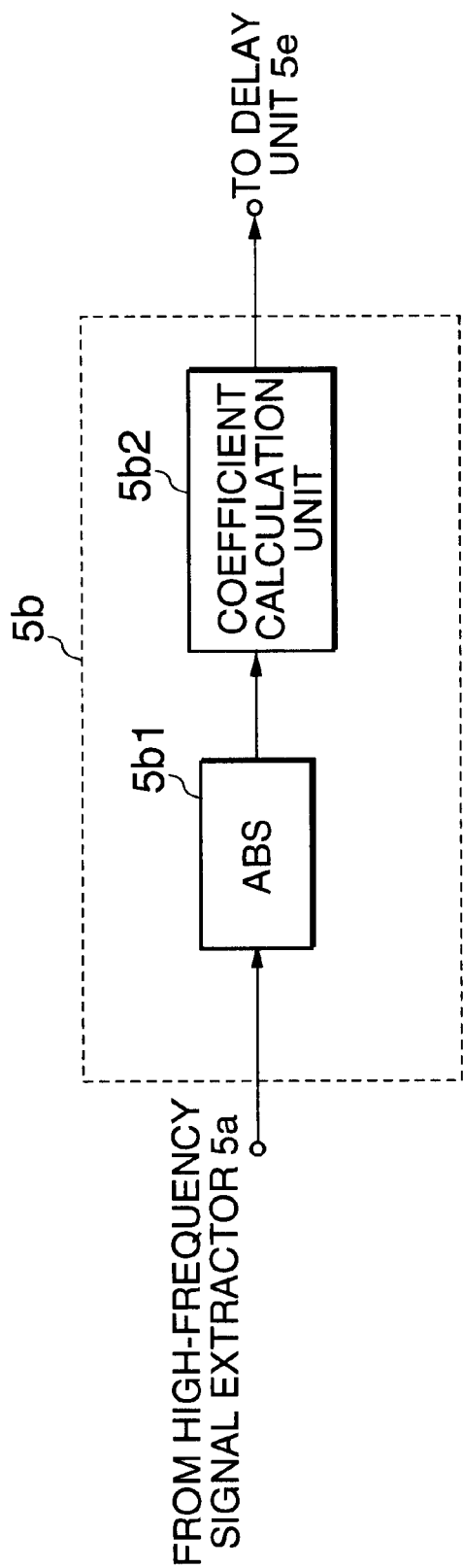
FIG. 5 is a block diagram showing an example of the internal structure of the coefficient generator in FIG. 3.

FIG. 5 shows an example of the internal structure of the coefficient generator 5b, comprising an absolute-value calculation unit (ABS) 5b1 and a coefficient calculation unit 5b2. The absolute-value calculation unit 5b1 receives and takes the absolute value of the output of the high-frequency signal extractor 5a. The third waveform (c) in FIG. 4, in which each noise spike appears as a single peak, represents the output of the absolute-value calculation unit 5b1. The coefficient calculation unit 5b2 converts the output of the absolute-value calculation unit 5b1 to a noise reduction coefficient that approaches zero when a noise spike appears, and approaches one when the noise spike disappears, enabling the individual noise spikes to be removed without distortion of other parts of the demodulated signal.

Figure 6:
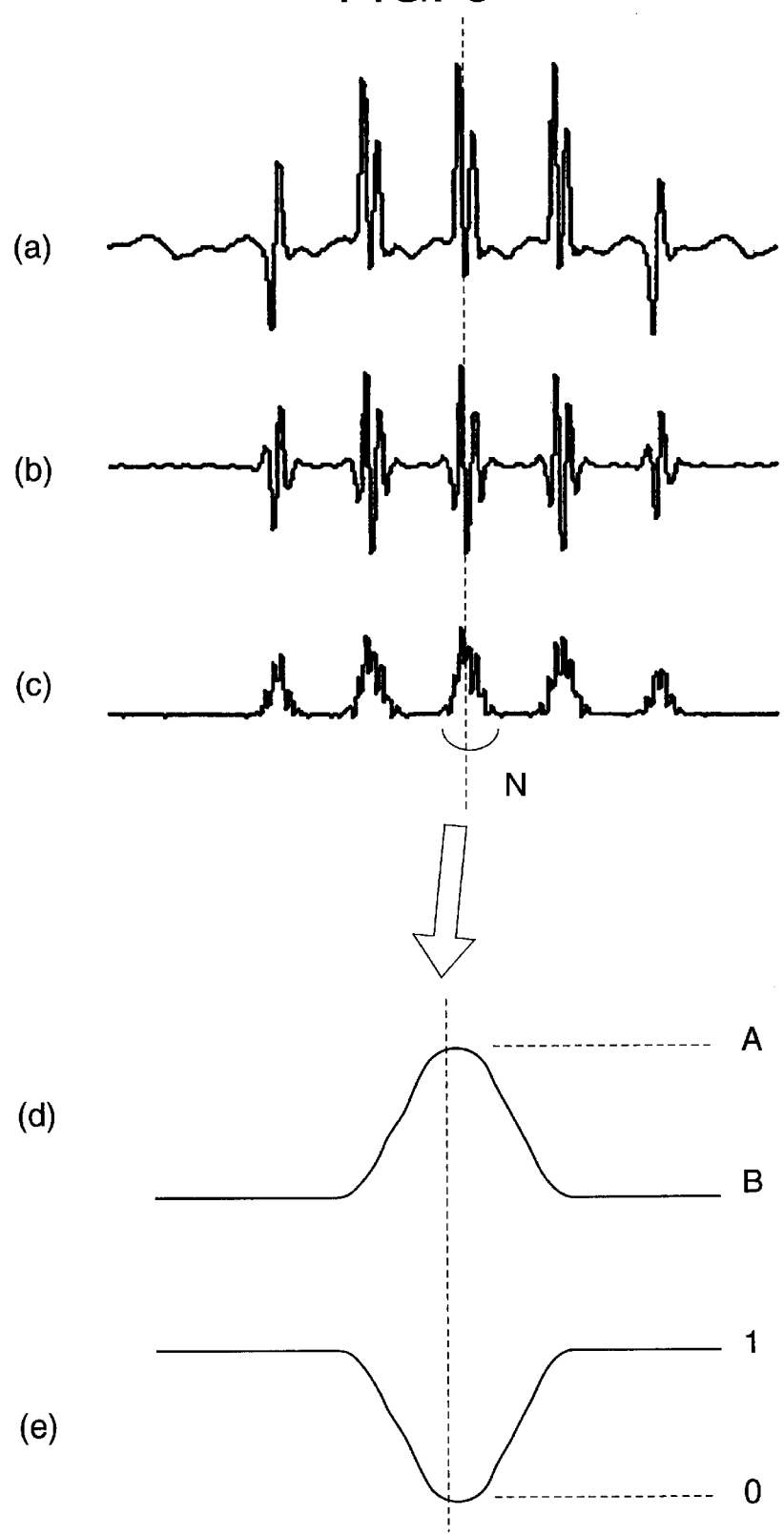
FIG. 6 is a waveform diagram illustrating the operation of the coefficient generator in FIG. 5.

The operation of the coefficient calculation unit 5b2 is illustrated in FIG. 6. The first three waveforms correspond to the first three waveforms in FIG. 4, illustrating the demodulated signal (a), the high-frequency signal extracted therefrom by the high-frequency signal extractor 5a (b), and the output of the absolute-value calculation unit 5b1 (c). The portion of the third waveform (c) marked N represents one noise spike. If high-frequency components are removed from this waveform, as described later, the portion marked N has the appearance shown in the next waveform (d). This waveform (d) is inverted to produce the waveform (e) of the noise reduction coefficient.

The simplest way to convert waveform (d) to waveform (e) is by a linear conversion process. If the output of the absolute-value calculation unit 5b1 is denoted by the letter x, and if this output (after removal of high-frequency components) varies between values of A and B (B≦x≦A), then the noise reduction coefficient y is given by the following equation (1).

$$y=(A-x)/(A-B) \qquad (1)$$

Delay unit 5c delays the output of the FM demodulator 4 by an amount that compensates for the delay in the high-frequency signal extractor 5a. In the signal component separator 5m, the low-frequency separator 5d separates the low-frequency component from the output of delay unit 5c, and outputs this component; an example of the low-frequency output is shown by the fifth waveform (e) in FIG. 4.

Delay units 5e and 5f align the timing of the outputs of the coefficient generator 5b and delay unit 5c with the timing of the output of the low-frequency separator 5d: delay unit 5e delays the output of the coefficient generator 5b by an amount that compensates for the difference in processing delay between the coefficient generator 5b and the low-frequency separator 5d; delay unit 5f delays the output of delay unit 5c by an amount that compensates for the processing delay in the low-frequency separator 5d. Alternatively, if the delay in the low-frequency separator 5d is sufficiently long, the delay in delay unit 5c may be set to zero, in which case delay unit 5e compensates for the difference between the delay in the low-frequency separator 5d and the combined delay in the high-frequency signal extractor 5a and coefficient generator 5b.

The subtractor 5g in the signal component separator 5m subtracts the output of the low-frequency separator 5d from the output of delay unit 5f, thereby removing the low-frequency component from the demodulated signal. In this way the high-frequency component of the demodulated signal is obtained, producing the sixth waveform (f) in FIG. 4.

The signal component separator 5m need not be structured as shown in FIG. 3; there are other ways to separate the demodulated signal into a high-frequency component and a low-frequency component and output both components. For example, instead of extracting the low-frequency component from the demodulated signal and subtracting it to obtain the high-frequency component, the signal component separator 5m may extract the high-frequency component from the demodulated signal and subtract it to obtain the low-frequency component. Alternatively, the signal component separator 5m could be configured to extract both the high-frequency component and the low-frequency component directly from the demodulated signal, although in that case very careful design would be required with respect to the cut-off frequencies and phase distortion of the high-frequency and low-frequency extraction circuits.

The multiplier 5h multiplies the high-frequency component output from the signal component separator 5m (the output of the subtractor 5g) by the delayed noise reduction coefficient output from the delay unit 5e, thereby selectively attenuating the spike noise and leaving a substantially noise-free high-frequency component as illustrated by the seventh waveform (g) in FIG. 4.

The adder 5i adds the output of the multiplier 5h to the low-frequency component output from the signal component separator 5m (the output of the low-frequency separator 5d), thereby obtaining a demodulated signal from which spike noise has been removed, as illustrated by the eighth waveform (h) in FIG. 4. This demodulated signal is the output of the multipath noise reducer 5; it is supplied to the noise reducer 6 for further removal of impulse noise.

Figure 7:
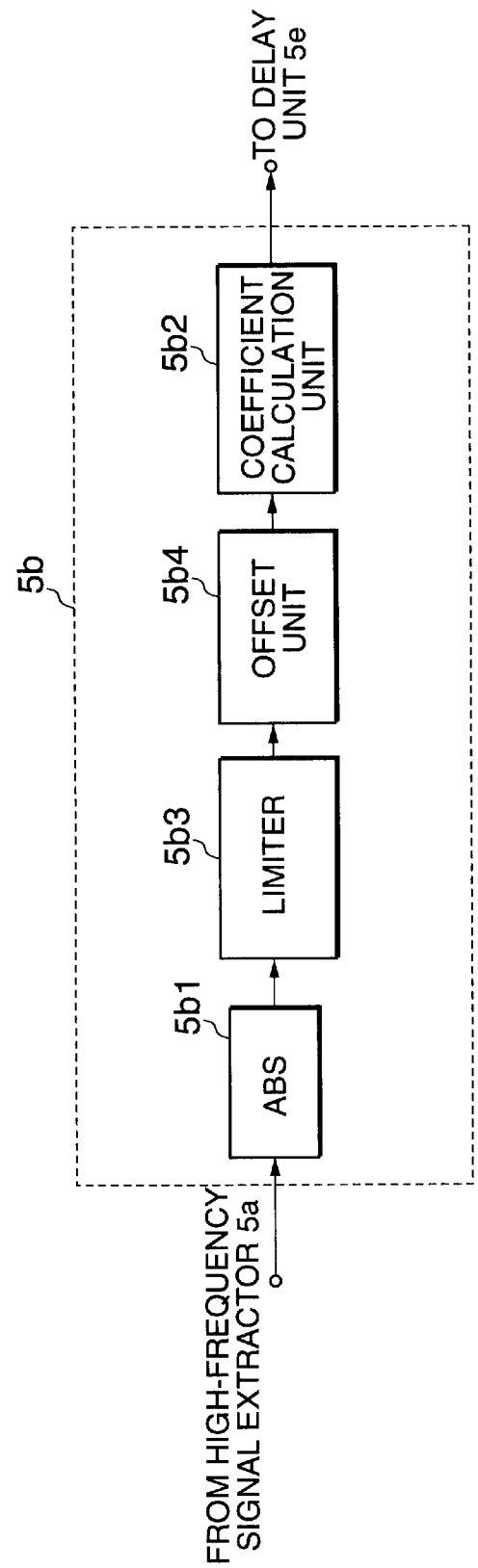
FIG. 7 is a block diagram showing another example of the internal structure of the coefficient generator in FIG. 3.

FIG. 7 shows another example of the internal structure of the coefficient generator 5b, in which a limiter 5b3 and an offset unit 5b4 are inserted between the absolute-value calculation unit 5b1 and the coefficient calculation unit 5b2 of FIG. 4. The limiter 5b3 may either precede or follow the offset unit 5b4.

Figure 8:
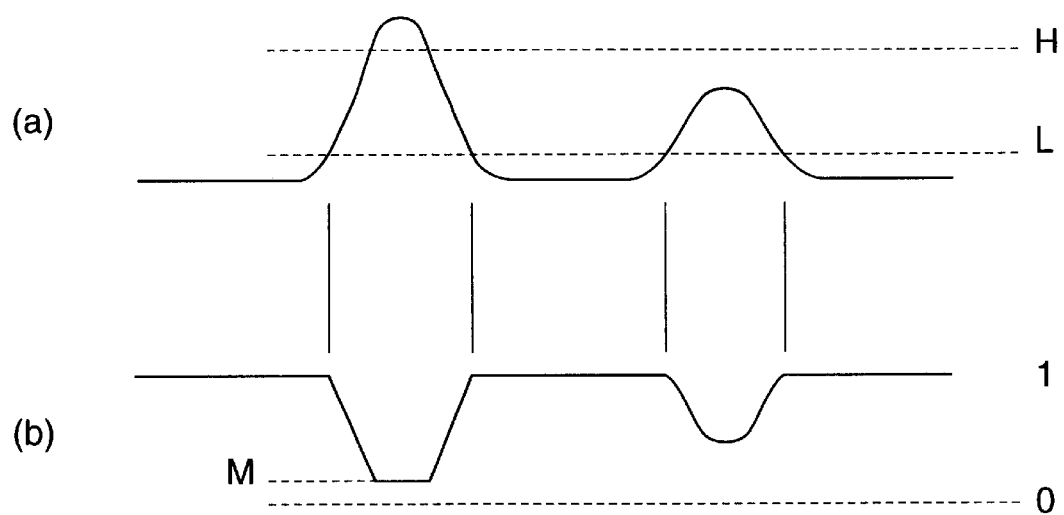
FIG. 8 is a waveform diagram illustrating the operation of the coefficient generator in FIG. 7.

The operation of the coefficient generator 5b in FIG. 7 is illustrated schematically by the waveforms in FIG. 8. The first waveform (a) is a simplified depiction of the output of the absolute-value calculation unit 5b1, similar to the fourth waveform (d) in FIG. 6. As shown in FIG. 8, different noise spikes may have different sizes and shapes, so the amplitude of the noise as revealed in the output of the absolute-value calculation unit 5b1 may vary from spike to spike. The limiter 5b3 clips the output of the absolute-value calculation unit 5b1 at an upper limit H.

Furthermore, since the absolute-value calculation unit 5b1 operates on the output of the high-frequency signal extractor 5a, even when multipath noise is absent, high-frequency components of the demodulated signal output by the FM demodulator 4 may produce a slight ripple (not illustrated in FIG. 8) in the output of the absolute-value calculation unit 5b1. To avoid attenuation of this ripple, the offset unit 5b4 sets an offset L and raises values of the output of the absolute-value calculation unit 5b1 or limiter 5b3 that are smaller than L so that they are equal to L.

After the output of the absolute-value calculation unit 5b1 has been reshaped in this way by the limiter 5b3 and offset unit 5b4, the coefficient calculation unit 5b2 generates a noise reduction coefficient signal as illustrated by the second waveform (b) in FIG. 8. If the output of the absolute-value calculation unit 5b1 is equal to or less than the offset L, the noise reduction coefficient is set equal to unity, to avoid attenuation of the high-frequency component; since multiplication by unity has no effect, no attenuation is performed. If the output of the absolute-value calculation unit 5b1 is equal to or greater than the upper limit H, the noise reduction coefficient has a predetermined value M; this is the maximum attenuation that is applied to the high-frequency component. As the output of the absolute-value calculation unit 5b1 varies between the offset L and the upper limit H, the noise reduction coefficient varies correspondingly between unity and M.

The spike noise can be completely muted by setting M equal to zero, but this is not necessarily desirable, because complete muting can create an unnatural effect. The appropriate muting level (the value of M) can best be determined experimentally.

A formula for converting the first waveform (a) in FIG. 8 to the second waveform (b) is given below, the letter x again representing the output of the absolute-value calculation unit 5b1 and the letter y representing the noise reduction coefficient.

$$y=\{(M-1)x+H-(M\cdot L)\}/(H-L) \quad (2)$$

Instead of the linear conversion formula given by the equations (1 and 2) above, it is possible to use various non-linear conversion methods. For example, the range of x can be subdivided into sub-ranges with different conversion characteristics, or a conversion table can be used.

Figure 9:
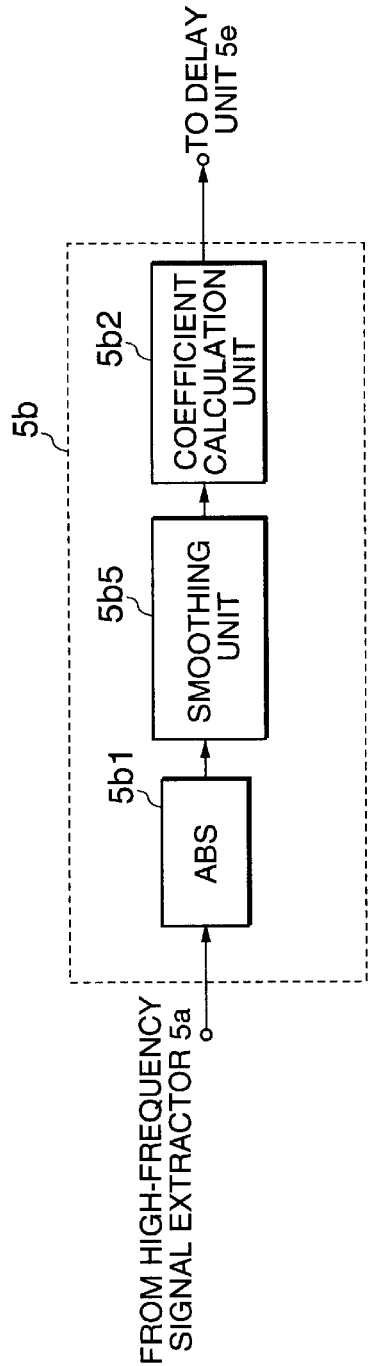
FIGS. 9 and 10 are block diagrams showing further examples of the internal structure of the coefficient generator in FIG. 3.

FIG. 9 shows yet another example of the internal structure of the coefficient generator 5b, in which a smoothing unit 5b5 is inserted between the absolute-value calculation unit 5b1 and the coefficient calculation unit 5b2 of FIG. 5. As shown by the third waveform (c) in FIG. 6, the output of the absolute-value calculation unit 5b1 is obtained by folding the negative part of the output of the high-frequency signal extractor 5a over to the positive side, so the resulting signal has a very rough outline. When this signal is converted to a noise reduction coefficient by the coefficient calculation unit 5b2, the valleys of the noise reduction coefficient waveform do not necessarily match the peaks of the spike noise waveform, and the spike noise may not be attenuated as accurately as desired. By smoothing the output of the absolute-value calculation unit 5b1, the smoothing unit 5b5 in FIG. 9 produces the type of waveform illustrated in the fourth waveform (d) in FIG. 6, referred to below as an envelope signal. This envelope signal is converted to the noise reduction coefficient signal shown as the fifth waveform (e) in FIG. 6, which is better able to attenuate the spike noise.

Figure 10:
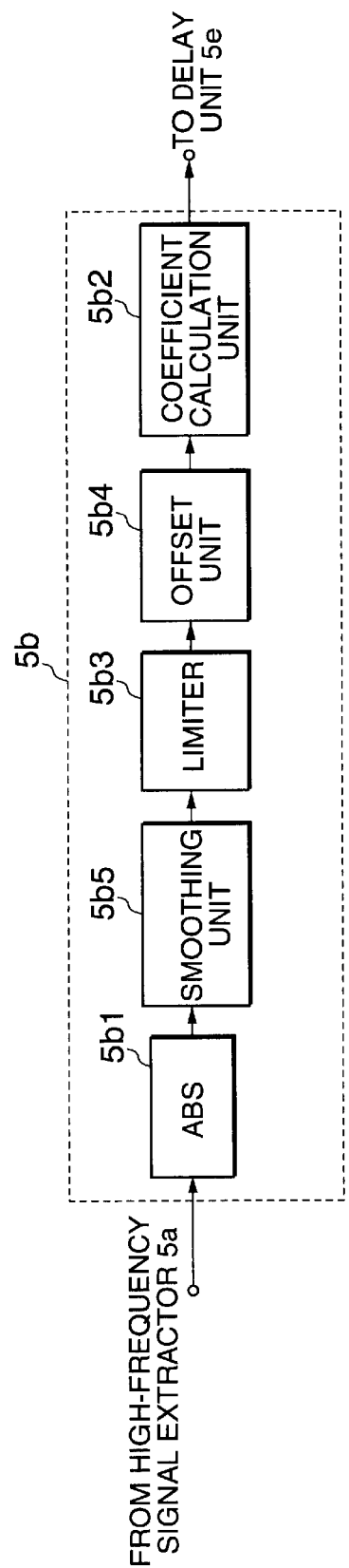

FIG. 10 shows still another example of the internal structure of the coefficient generator 5b, in which a limiter 5b3 and an offset unit 5b4 are inserted between the coefficient calculation unit 5b2 and the smoothing unit 5b5 of FIG. 9. It is this structure that produces the waveforms shown in FIG. 8; without the smoothing unit 5b5, the waveforms would have a rougher appearance.

Figure 11:
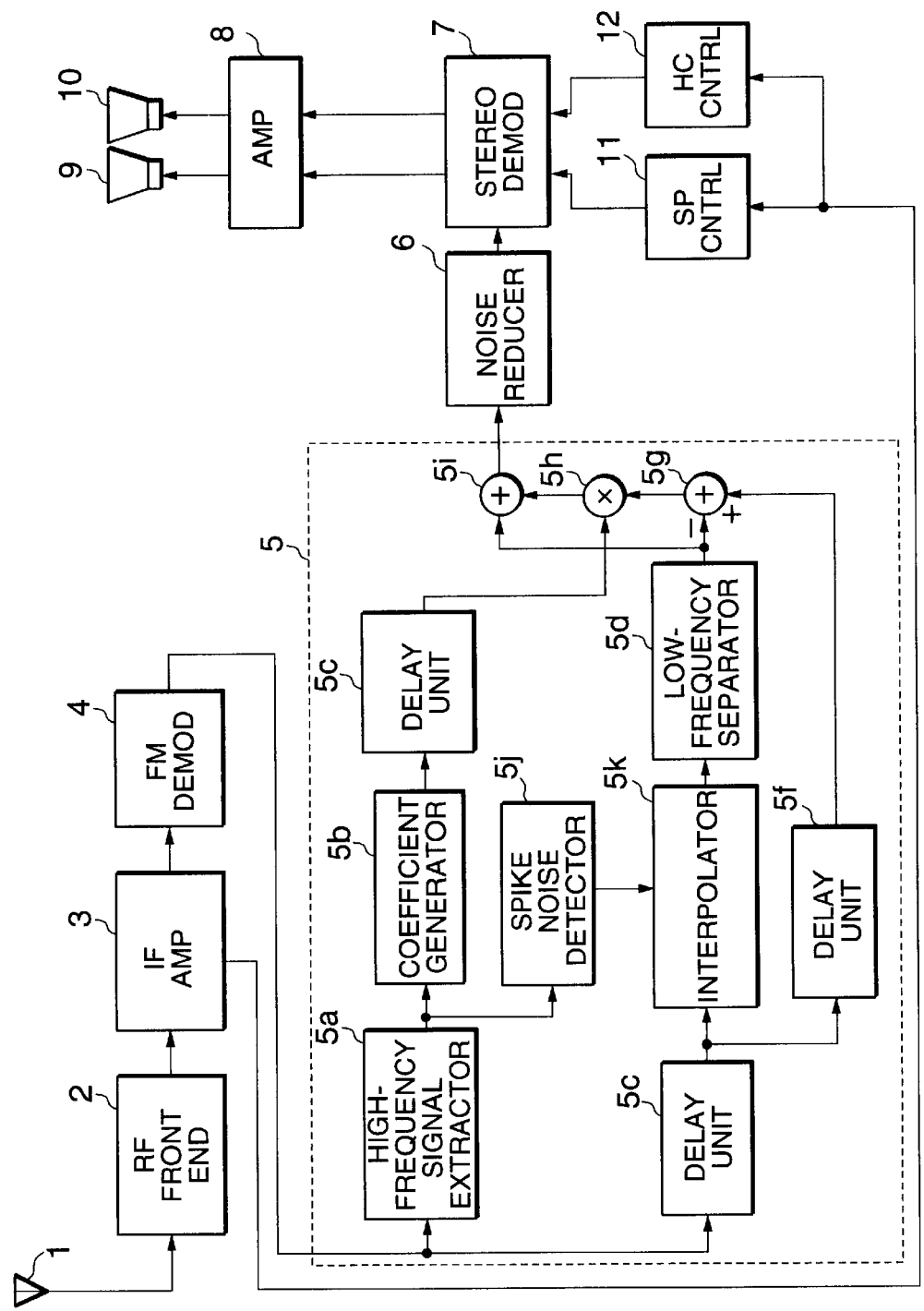
FIG. 11 is a block diagram of an FM stereo radio receiver illustrating a second embodiment of the invention.

FIG. 11 shows a second embodiment of the invention, one that adds a spike noise detector 5j and an interpolation unit 5k to the configuration of the multipath noise reducer 5 in the first embodiment. The spike noise detector 5j receives the output of the high-frequency signal extractor Sa, detects spike noise, and sends a detection signal to the interpolation unit 5k; the interpolation unit 5k is inserted between delay unit 5c and the low-frequency separator 5d. The second embodiment also places an absolute-value calculation unit in the high-frequency signal extractor 5a, as shown later. The other elements in FIG. 11 are the same as the corresponding elements in FIG. 3, so descriptions will be omitted.

The spike noise detector 5j detects spike noise when the output of the high-frequency signal extractor 5a exceeds a threshold level. The interpolation unit 5k responds to the detection of spike noise by generating an internal gate pulse and replacing the delayed demodulated signal received from delay unit 5c with an interpolated signal during the duration of the gate pulse.

The need for an absolute-value calculation unit in the high-frequency signal extractor 5a is illustrated by FIG. 12. The first waveform (a) illustrates two noise spikes in the demodulated signal received by the high-frequency signal extractor 5a, one a positive spike, the other a negative spike. In practice, both types of spikes occur, depending on the conditions in which the noise is generated and on variations in the modulating signal. If the high-frequency signal extractor 5a included only a high-pass filter, the output by the high-frequency signal extractor 5a would have the second waveform (b) in FIG. 12. Each noise spike is converted to a signal that swings both above and below a reference level (for example, above and below ground level), but for the positive noise spike, the upswing precedes the downswing, while for the negative noise spike, the downswing precedes the upswing.

The third waveform (c) in FIG. 12 illustrates the detection signal generated by the spike noise detector 5j from the second waveform (b). This signal goes high while the output of the high-frequency signal extractor 5a is above a threshold level indicated by the dotted line in waveform (b). The detection pulse occurs near the front of the positive noise spike and near the back of the negative noise spike. A gate pulse (tg) with a pulse width equal to the spike width, beginning at the detection pulse as illustrated in the fourth waveform (d), would correctly correspond to the positive noise spike, but not to the negative noise spike. To cover both types of spikes, the interpolation unit 5k would have to generate a wider gate pulse (tgw) as illustrated in the fifth waveform (e), but this wider pulse would not correspond accurately to either type of noise spike, and would lead to an unnecessary long interpolation interval. The unnecessarily long interpolation interval could mask desired signal components, becoming another source of distortion in the output signal of the multipath noise reducer 5.

The high-frequency signal extractor 5a in the second embodiment therefore has, for example, the structure shown in FIG. 13, comprising an absolute-value calculation unit (ABS) 5a1 and a high-pass filter (HPF) 5a2. The absolute-value calculation unit 5a1 converts the demodulated signal shown by the first waveform (a) in FIG. 12 to the rectified signal shown by the sixth waveform (f), in which all noise spikes are positive spikes. The high-pass filter 5a2 then generates a signal as shown by the seventh waveform (g), and the spike noise detector 5j outputs detection pulses at the positions shown in the eighth waveform (h), corresponding to the front of each noise spike. The interpolation unit 5k can accordingly generate gate pulses (tg) with widths equal to the width of the noise spikes and have these pulses match the actual positions of the noise spikes, as shown in the ninth waveform (i).

FIG. 14 shows another and more preferable structure of the high-frequency signal extractor 5a in the second embodiment, comprising an absolute-value calculation unit 5a1 and a pair of high-pass filters 5a2, 5a3. The absolute-value calculation unit 5a1 and high-pass filter 5a2 operate as in FIG. 13, generating the high-frequency signal output to the spike noise detector 5j. High-pass filter 5a3 operates directly on the demodulated signal, bypassing the absolute-value calculation unit 5a1, and generates the high-frequency signal output to the coefficient generator 5b. The reason for this structure is that while the absolute-value calculation unit 5a1 assists the spike noise detector 5j in generating spike noise detection pulses at the correct positions, the additional high-frequency components generated by the folding of the demodulated signal in the absolute-value calculation unit 5a1 is disadvantageous for the operation of the coefficient generator 5b.

Figure 15:
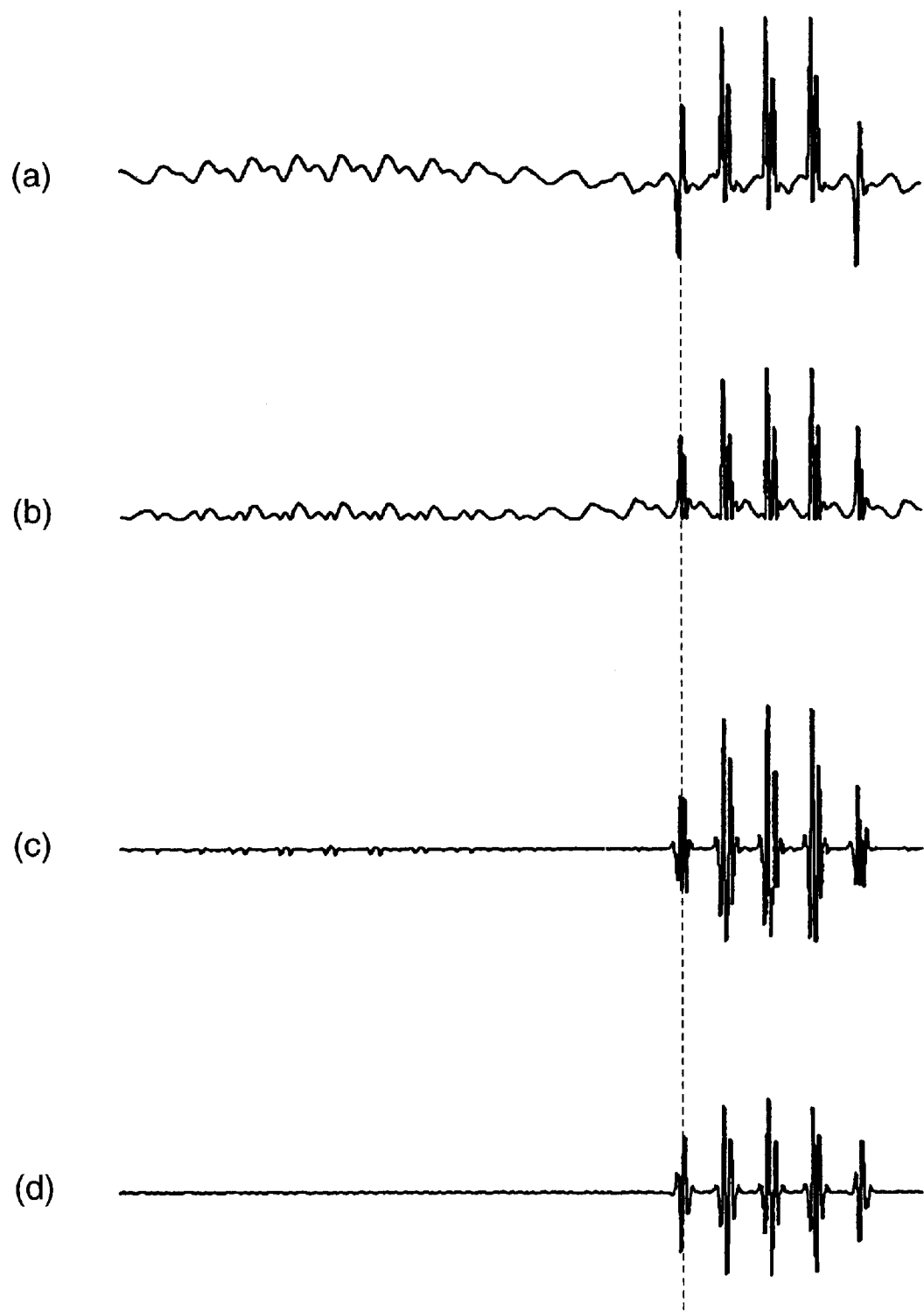
FIG. 15 is a waveform diagram illustrating the operation of the high-frequency signal extractor.

The operation of the high-frequency signal extractor 5a in FIG. 14 is illustrated by the waveforms in FIG. 15, in which the vertical dotted line indicates the position of the onset of spike noise. The first waveform (a) is an example of the demodulated signal. The second waveform (b) shows the corresponding output of the absolute-value calculation unit 5a1. The third waveform (c) shows the corresponding output of high-pass filter 5a2. This waveform includes a slight high-frequency ripple preceding the onset of spike noise, due to additional high-frequency components generated by fold-over when the absolute value is taken, but the ripple is too slight to affect the operation of the spike noise detector 5j. The fourth waveform shows the output of high-pass filter 5a3, which is free of additional high-frequency components generated by fold-over. Use of this waveform enables the coefficient generator 5b to generate a noise reduction coefficient waveform that is free of unnecessary variations when spike noise is not present.

Figure 16:
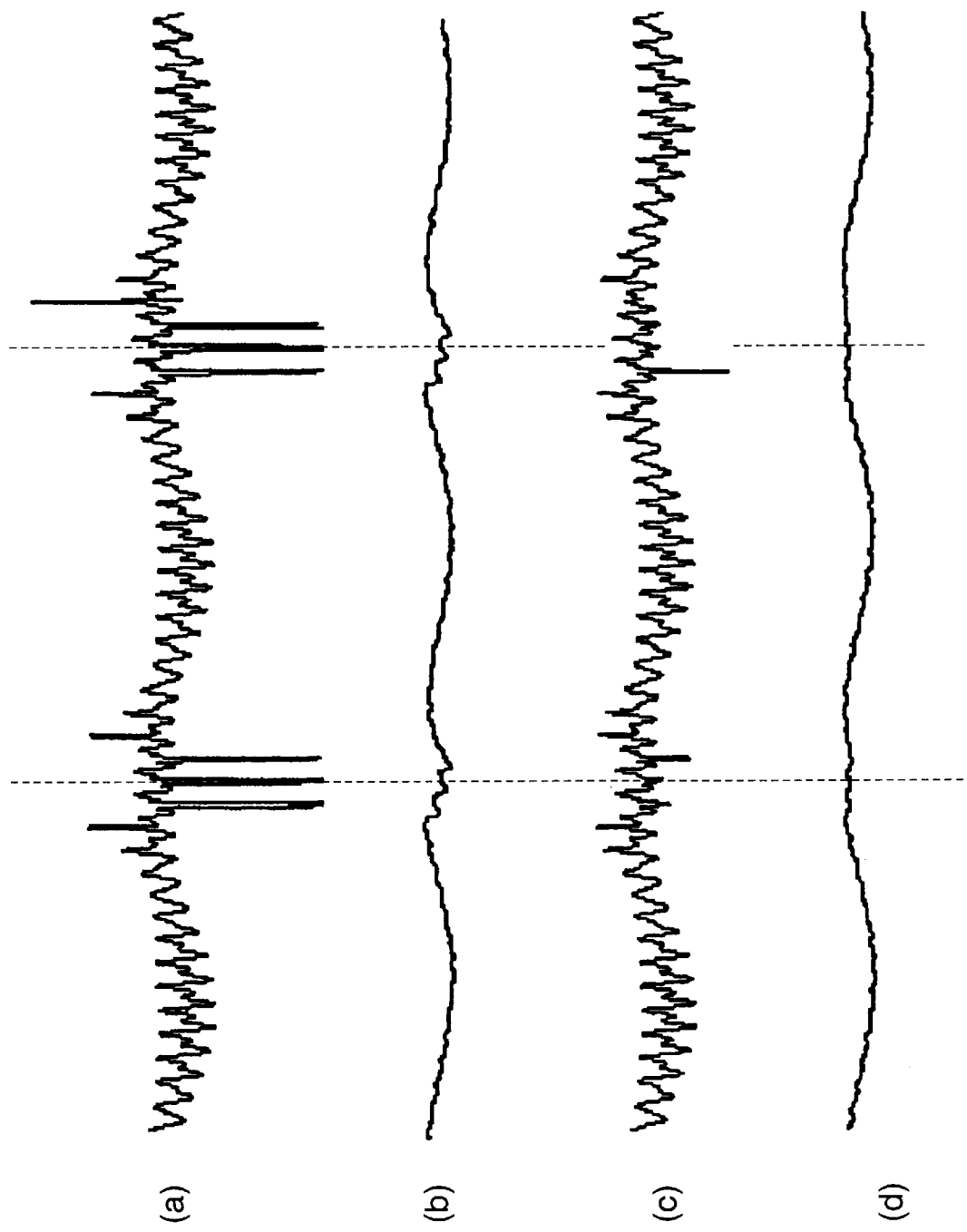
FIG. 16 is a waveform diagram illustrating the effect of interpolation in the second embodiment.

FIG. 16 illustrates the effect of the interpolation unit 5k. The vertical dotted lines mark the positions of two short intervals of spike noise. The first waveform (a) is the delayed demodulated signal output from delay unit 5c. The second waveform (b) is the waveform obtained therefrom by the low-frequency separator 5d in the first embodiment, by use of a smoothing filter, for example. Noticeable distortion occurs at the two spike noise positions. The third waveform (c) is obtained by the interpolation unit 5k in the second embodiment; most of the noise spikes have been eliminated by interpolation. The fourth waveform (d) is obtained from the third waveform (c) by the low-frequency separator 5d in the second embodiment. The remaining spike noise has very little effect on this waveform, which is largely free of distortion.

Figure 17:
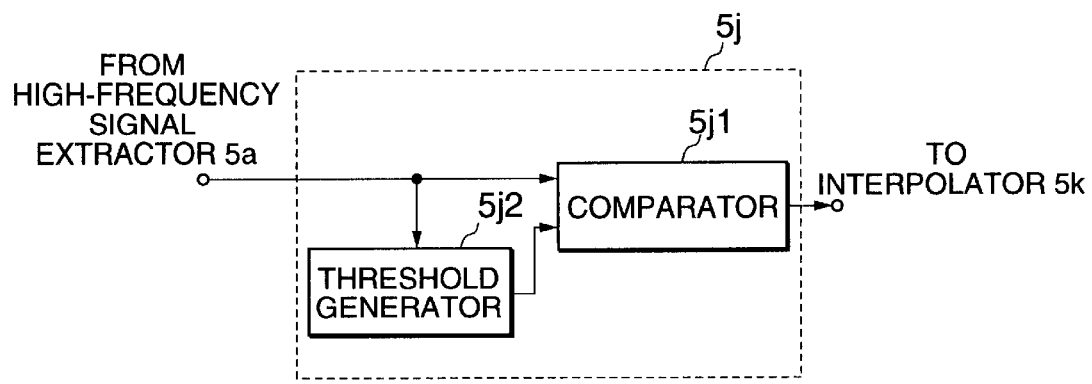
FIG. 17 is a block diagram showing an example of the internal structure of the spike noise detector in FIG. 11.

FIG. 17 shows an example of the internal structure of the spike noise detector 5j, comprising a comparator 5j1 and a threshold generator 5j2. The comparator 5j1 compares the output of the high-frequency signal extractor 5a with a threshold signal generated by the threshold generator 5j2, and generates a detection signal that indicates whether the output of the high-frequency signal extractor 5a is or is not greater than the threshold. The threshold generator 5j2 generates the threshold value by smoothing the absolute value of the output of the high-frequency signal extractor 5a. When much spike noise is present, the threshold value rises, so the threshold generator 5j2 detects proportionately less of the spike noise than during intervals in which less spike noise is present. As a result, when much spike noise is present, interpolation is performed only during relatively large noise spikes, so that the effects of interpolation remain unobtrusive.

Alternatively, the spike noise detector 5j can be simplified by using a constant threshold.

Figure 18:
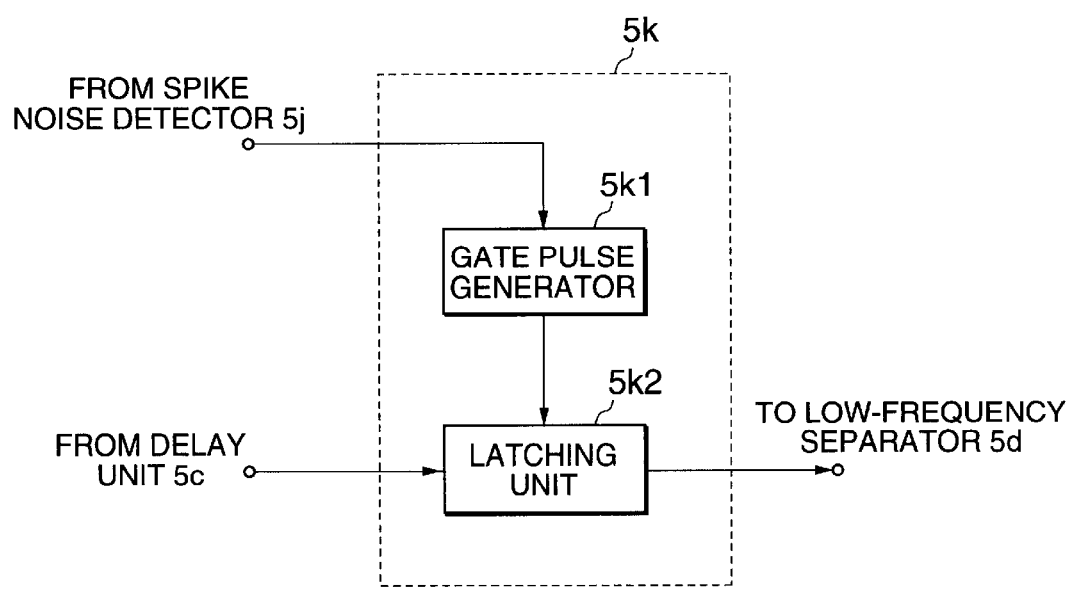
FIG. 18 is a block diagram showing an example of the internal structure of the interpolation unit in FIG. 11.

FIG. 18 shows an example of the internal structure of the interpolation unit 5k, comprising a gate pulse generator 5k1 and a latching unit 5k2. From the detection pulses output by the spike noise detector 5j, the gate pulse generator 5k1 generates a gate signal with pulses having a preset width equivalent to the width of the noise spikes. The latching unit 5k2 receives the gate signal and the delayed demodulated signal output by delay unit 5c. While the gate signal is inactive, the latching unit 5k2 passes the delayed demodulated signal on without alteration to the low-frequency separator 5d. While the gate signal is active, the latching unit 5k2 performs constant interpolation by latching and repeatedly outputting the last value of the delayed demodulated signal received from delay unit 5c before the gate signal went to the active level.

Figure 19:
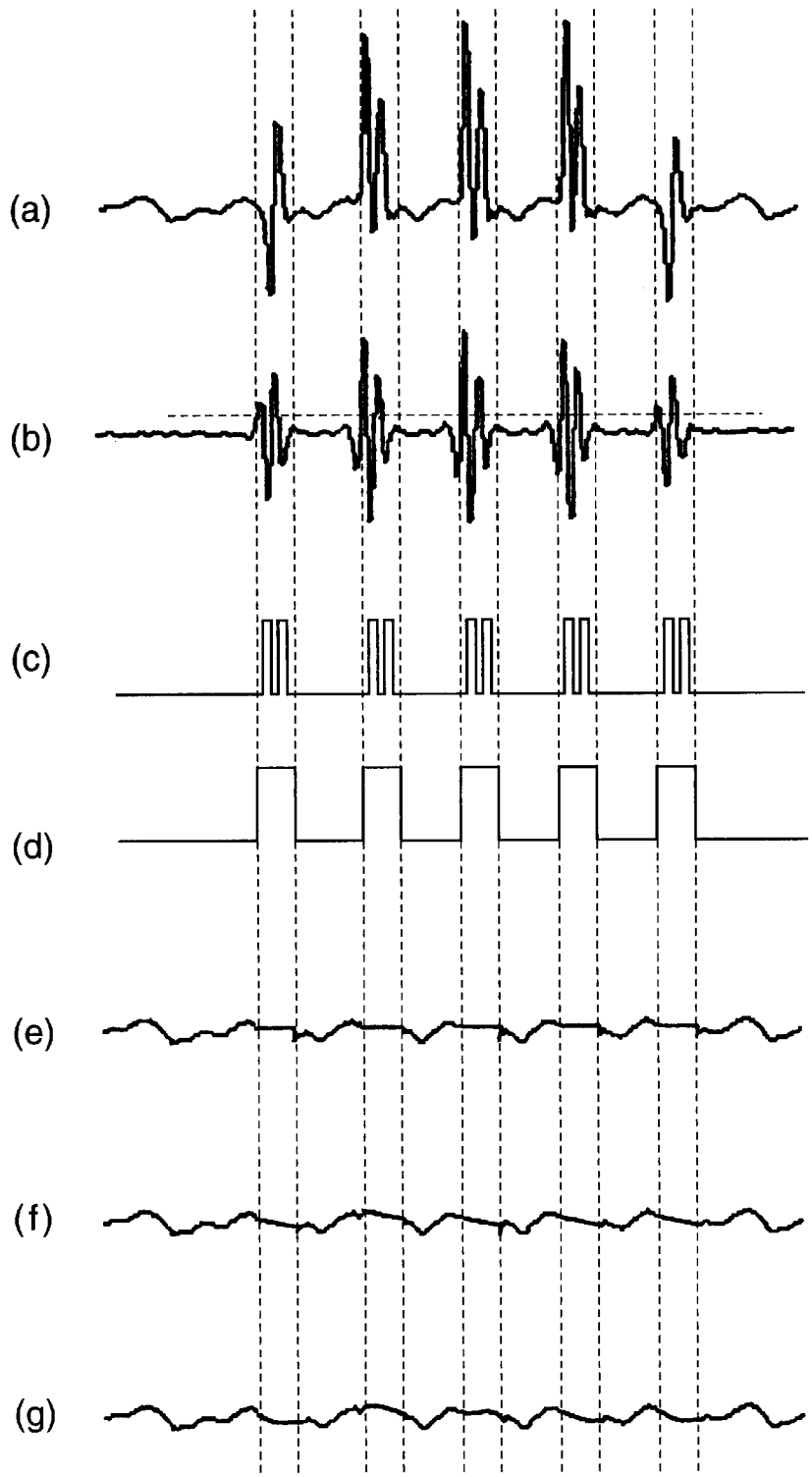
FIG. 19 is a waveform diagram illustrating the operation of the spike noise detector and interpolation unit in FIG. 11.

The combined operation of the spike noise detector 5j and interpolation unit 5k is illustrated in FIG. 19. The first waveform (a) is the demodulated signal, including multipath noise. The second waveform (b) is the output of the high-frequency signal extractor 5a. By comparing this signal (b) with the threshold level indicated by the dotted horizontal line, the spike noise detector 5j generates the spike noise detection pulses shown in the third waveform (c). The interpolation unit 5k generates internal gate pulses with widths expanded to match the typical width of the noise spikes, as shown in the fourth waveform (d), and interpolates by latching the value just preceding each gate pulse, as shown in the fifth waveform (e). When the gate signal is inactive, the fifth waveform (e) is identical to the first waveform (a), the delay introduced by the delay unit 5c being ignored here for simplicity. The interpolation unit 5k thus produces a signal in which spike noise has been removed from the output of delay unit 5c. The low-frequency separator 5d obtains the low-frequency component of the demodulated signal from the output of the interpolation unit 5k.

Figure 20:
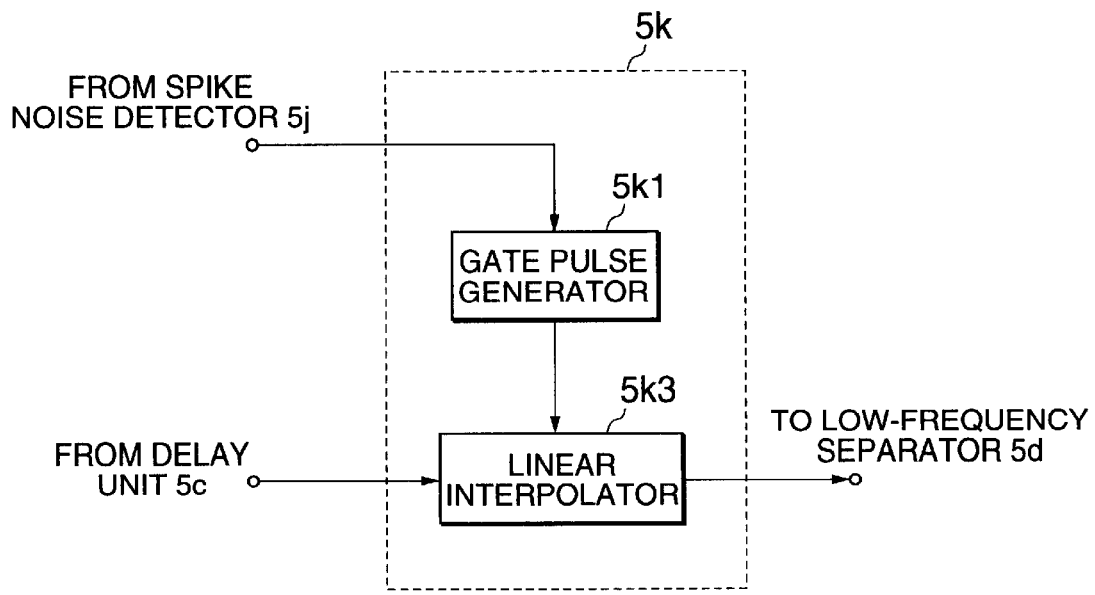
FIGS. 20 and 21 are block diagrams showing other examples of the internal structure of the interpolation unit in FIG. 11.
Figure 21:
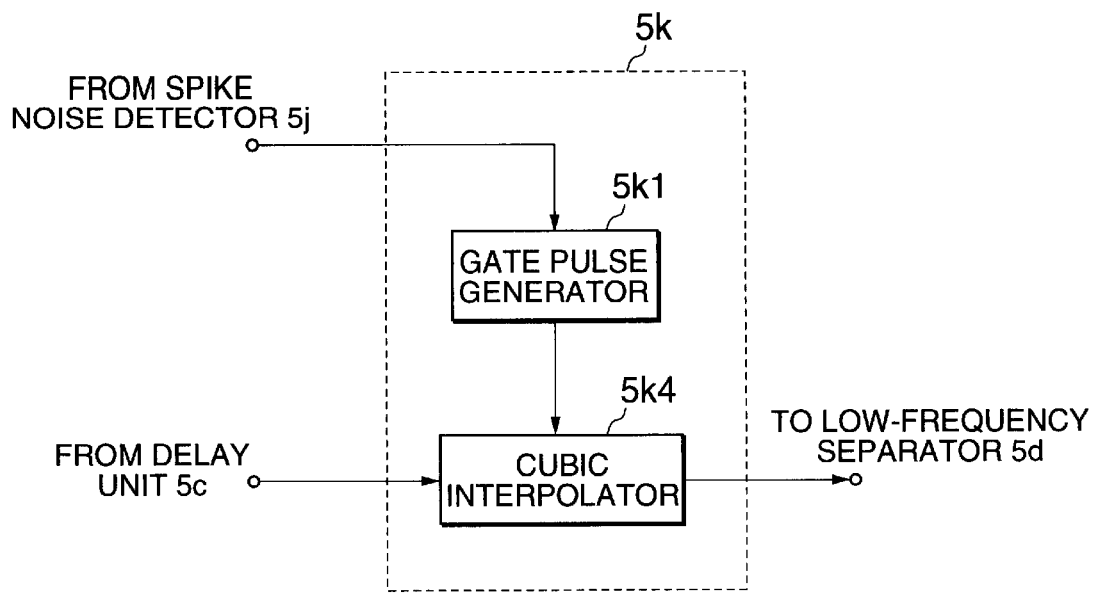

FIGS. 20 and 21 show alternative examples of the internal structure of the interpolation unit 5k. Both of these examples include the same gate pulse generator 5k1 as in FIG. 18.

The linear interpolator 5k3 in FIG. 20 performs linear interpolation over the interval of each gate pulse received from the gate pulse generator 5k1, using the values of the delayed demodulated signal received from delay unit 5c just before and just after the gate pulse. The output of the linear interpolator 5k3 is shown as the sixth waveform (f) in FIG. 19. Linear interpolation generally leaves less distortion than constant interpolation.

The cubic interpolator 5k4 in FIG. 21 uses the Lagrange polynomial of the third degree to perform interpolation (referred to below as cubic interpolation) over the interval of each gate pulse received from the gate pulse generator 5k1, based on the two values of the delayed demodulated signal just preceding and the two values just following the gate pulse. The output of the cubic interpolator 5k4 is shown as the seventh waveform (g) in FIG. 19. Cubic interpolation leaves even less distortion than linear interpolation.

Figure 22:
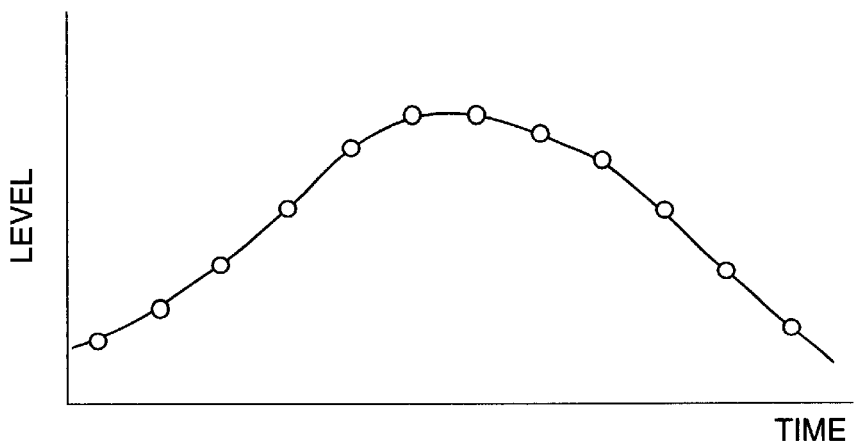
FIGS. 22, 23, and 24 are waveform diagrams illustrating the operation of the interpolation unit in FIG. 21.
Figure 23:
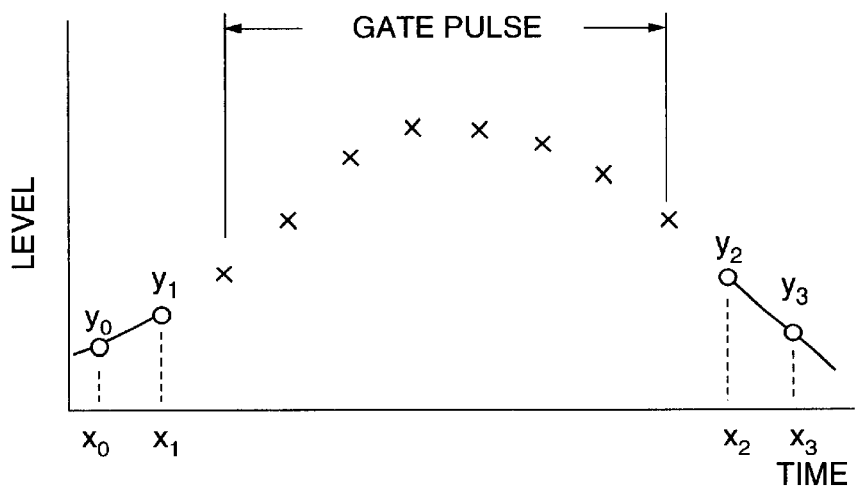
Figure 24:
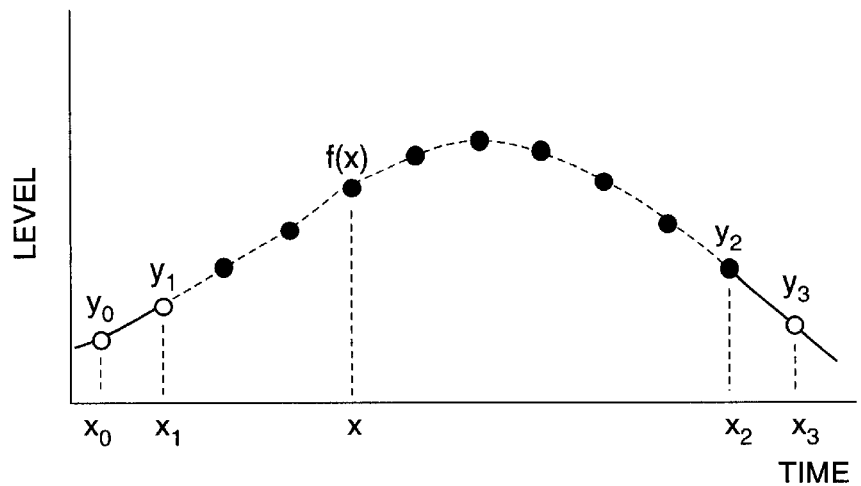

Cubic interpolation is illustrated in FIGS. 22, 23, and 24. In each of these drawings, time is indicated on the horizontal axis, and signal value (level) on the vertical axis. FIG. 22 shows a portion of the desired demodulated signal; the circles denote sampling points. In FIG. 23, the samples indicated by x's have been masked by a gate pulse indicating the occurrence of spike noise. The two samples $y_0$, $y_1$ preceding the gate pulse and the two samples $y_2$, $y_3$ following the gate pulse, taken at times $x_0$, $x_1$, $x_2$, $x_3$, are left intact. In FIG. 24, a cubic function f(x) taking on values $y_0$, $y_1$, $y_2$, $y_3$ at times $x_0$, $x_1$, $x_2$, $x_3$ is constructed according to the third-degree Lagrange polynomial formula given by the equation (3) below, in which the sum ($\Sigma$) is taken over values of i from zero to three, and the products ($\Pi$) are taken over values of j from zero to three differing from i (that is, i=0 to 3, j=0 to 3, j≠i).

$$f(x)=\Sigma y_i\{(\Pi x - x_j)/(\Pi x_i - x_j)\} \quad (3)$$

As can be seen, the cubic function in FIG. 24 approximates the desired demodulated signal better than would a constant or linear interpolation.

Figure 25:
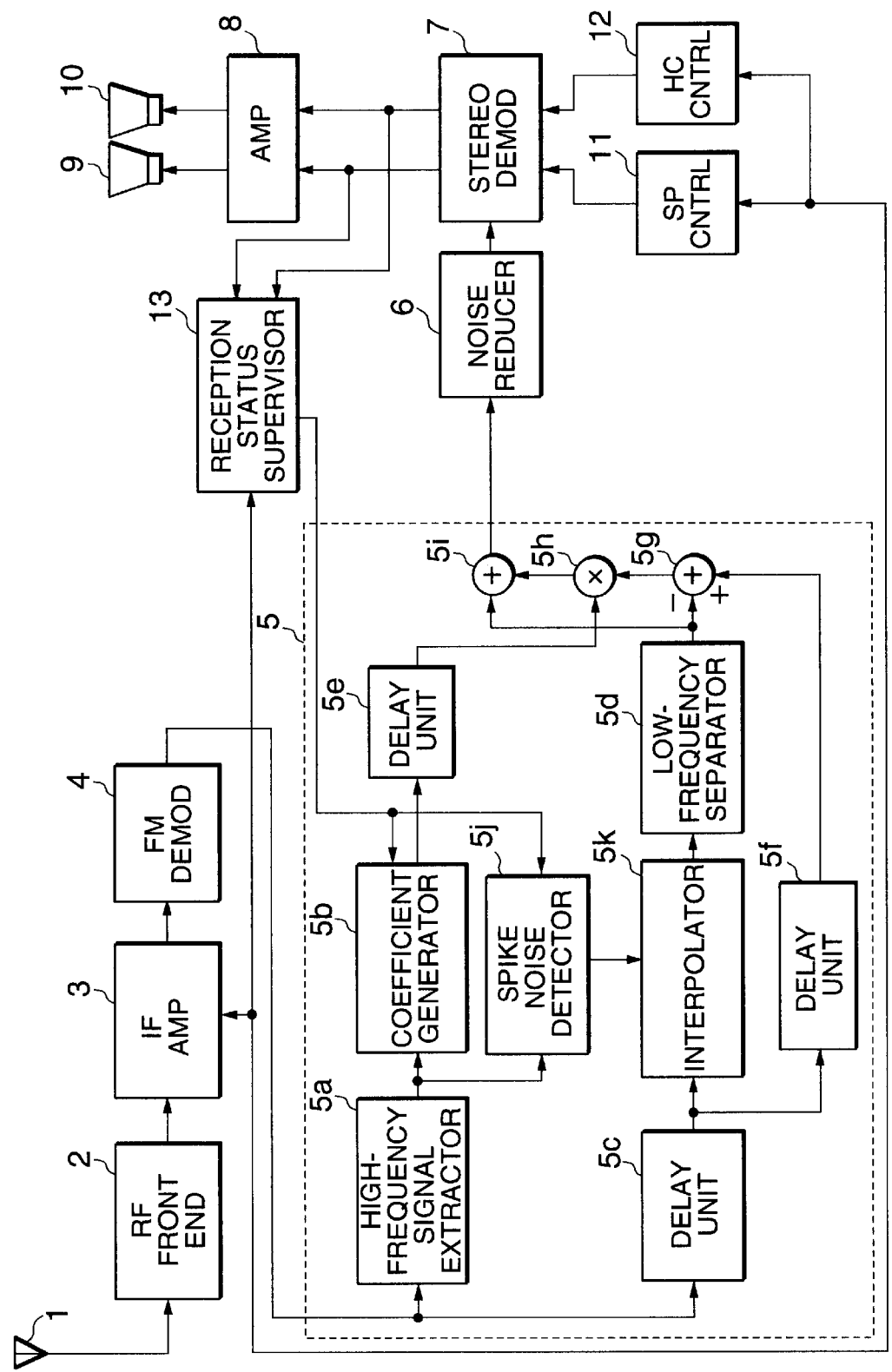
FIG. 25 is a block diagram of an FM stereo radio receiver illustrating a third embodiment of the invention.

As a third embodiment of the invention, FIG. 25 shows an FM receiver that adds a reception status supervisor 13 to the second embodiment shown in FIG. 11. The reception status supervisor 13 receives the S-meter signal output from the intermediate-frequency amplifier 3 and receives output signals from the stereo demodulator 7, and supplies control signals to the coefficient generator 5b and spike noise detector 5j. These control signals control the operation of the coefficient generator 5b and spike noise detector 5j according to reception status conditions such as the received frequency-modulated signal strength and the volume of the audio signal.

When the received frequency-modulated signal is weak, as indicated by the S-meter output, the noise floor (the general background noise level) in the demodulated signal rises. If the coefficient generator 5b employs an offset unit 5b4 as shown in FIG. 7, it is desirable to raise the offset level L when the received signal is weak, so that the noise reduction coefficient is not reduced in response to activity at the level of the noise floor in the output of the high-frequency signal extractor 5a. When the offset level L is raised, it is also desirable to raise the upper limit value H of the limiter 5b3, to maintain a proper balance between the parameters H and L. The reception status supervisor 13 performs this type of control of H and L.

Similarly, when the received frequency-modulated signal is weak and the noise floor is therefore comparatively high, it is desirable to raise the spike-noise detection threshold used by the spike noise detector 5j, to reduce the distortion caused by excessive interpolation by the interpolation unit 5k. The reception status supervisor 13 accordingly adjusts the threshold used in the spike noise detector 5j according to the S-meter output.

Furthermore, multipath noise is most noticeable when the amplitude level of the audio signal is low. When the amplitude level of the audio signal is high, the loud audio signal tends to conceal multipath noise. Accordingly, when the amplitude level of the audio signal is high, it is desirable to raise the minimum value M of the noise reduction coefficient in the coefficient generator 5b, lessening the attenuation of the multipath noise in order to reduce the distortion caused by the attenuation. The reception status supervisor 13 also performs this type of control of the parameter M.

In other respects, the third embodiment operates in the same way as the second embodiment, so further description will be omitted.

In the embodiments described above, the noise reducer 6 operated on the output of the multipath noise reducer 5, but this relationship can be reversed; the noise reducer 6 may receive the output of the FM demodulator 4, the multipath noise reducer 5 may receive the output of the noise reducer 6, and the stereo demodulator 7 may receive the output of the multipath noise reducer 5.

Although the multipath noise reducer 5 has been described as a digital circuit, analog circuitry may also be used.

Those skilled in the art will recognize that further variations are possible within the scope claimed below.

What is claimed is:

1. A method of reducing multipath noise appearing as spike noise in a demodulated signal obtained from a frequency-modulated signal, comprising the steps of:
   (a) extracting a high-frequency signal from the demodulated signal;
   (b) generating a noise reduction coefficient from the extracted high-frequency signal;
   (c) separating the demodulated signal into a high-frequency component and a low-frequency component;
   (d) multiplying the high-frequency component by the noise reduction coefficient to obtain a product signal; and
   (e) adding the product signal to the low-frequency component to obtain an output signal.

2. The method of claim 1, wherein said step (b) includes smoothing the extracted high-frequency signal to obtain an envelope signal, the noise reduction coefficient being generated from the envelope signal.

3. The method of claim 1, wherein said step (b) includes rectifying the extracted high-frequency signal by taking absolute values thereof, the noise reduction coefficient being generated from the rectified high-frequency signal.

4. The method of claim 3, wherein said step (b) includes setting the noise reduction coefficient to a minimum value, causing maximum attenuation of the high-frequency component of the demodulated signal, when the extracted high-frequency signal has an absolute value exceeding a predetermined upper limit.

5. The method of claim 3, wherein said step (b) includes setting the noise reduction coefficient to unity, thereby avoiding attenuation of the high-frequency component of the demodulated signal, when the extracted high-frequency signal has an absolute value less than a predetermined offset value.

6. The method of claim 1, further comprising the steps of:
   (f) detecting said spike noise by comparing the extracted high-frequency signal with a threshold; and
   (g) replacing the demodulated signal with an interpolated signal during intervals in which the spike noise is detected, thereby obtaining a modified signal from which the low-frequency component of the demodulated signal is obtained in said step (c).

7. The method of claim 6, further comprising the steps of:
(h) smoothing the extracted high-frequency signal; and
(i) varying the threshold in step (f) according to the smoothed extracted high-frequency signal.

8. The method of claim 6, wherein said step (a) includes rectifying the demodulated signal by taking absolute values, the high-frequency signal used in said step (f) being extracted from the rectified demodulated signal.

9. A multipath noise reducer for reducing multipath noise appearing as spike noise in a demodulated signal obtained from a frequency-modulated signal, comprising:
a high-frequency signal extractor for extracting a high-frequency signal from the demodulated signal;
a coefficient generator for generating a noise reduction coefficient from the extracted high-frequency signal;
a signal component separator for separating the demodulated signal into a high-frequency component and a low-frequency component;
a multiplier for multiplying the high-frequency component by the noise reduction coefficient to obtain a product signal; and
an adder for adding the product signal to the low-frequency component to obtain an output signal.

10. The multipath noise reducer of claim 9, wherein the high-frequency signal extractor comprises:
an absolute-value calculation unit for rectifying the extracted high-frequency signal by taking absolute values to obtain a rectified high-frequency signal; and
a coefficient calculation unit for generating the noise reduction coefficient from the rectified high-frequency signal.

11. The multipath noise reducer of claim 10, wherein the coefficient generator further comprises a smoothing unit for smoothing the rectified high-frequency signal before input to the coefficient calculation unit.

12. The multipath noise reducer of claim 10, wherein the coefficient generator further comprises a limiter for limiting the rectified high-frequency signal to a predetermined upper limit value.

13. The multipath noise reducer of claim 10, wherein the coefficient generator further comprises an offset unit for raising values of the rectified high-frequency signal less than a positive offset value to said positive offset value.

14. The multipath noise reducer of claim 13, further comprising a reception status supervisor for adjusting the positive offset value according to a signal strength of the frequency-modulated signal.

15. The multipath noise reducer of claim 9, further comprising:
a spike noise detector for detecting said spike noise by comparing the extracted high-frequency signal with a threshold; and
an interpolation unit for replacing the demodulated signal with an interpolated signal during intervals in which the spike noise is detected, before separation of the low-frequency component by the signal component separator.

16. The multipath noise reducer of claim 15, wherein the spike noise detector comprises:
a threshold generator for smoothing the extracted high-frequency signal and varying the threshold according to the smoothed extracted high-frequency signal; and
a comparator for comparing the extracted high-frequency signal with the threshold generated by the threshold generator.

17. The multipath noise reducer of claim 15, further comprising a reception status supervisor for adjusting the threshold according to a signal strength of the frequency-modulated signal.

18. The multipath noise reducer of claim 15, wherein the high-frequency signal extractor comprises:
an absolute-value calculation unit for rectifying the demodulated signal by taking absolute values; and
a high-pass filter for extracting the high-frequency signal from the rectified signal.

19. A frequency-modulation radio receiver including the multipath noise reducer of claim 9.

* * * * *